(12) United States Patent
Horng (10) Patent No.: US 7,786,639 B2
(45) Date of Patent: Aug. 31, 2010

(54) MOTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 137 days.

(21) Appl. No.: 12/253,338

(22) Filed: Oct. 17, 2008

(65) Prior Publication Data

US 2010/0072843 A1    Mar. 25, 2010

(30) Foreign Application Priority Data

Sep. 23, 2008    (TW)    ............... 97136468 A (51) Int. Cl.
*H02K 5/16*    (2006.01)
(52) U.S. Cl. .......................................... 310/91; 310/90
(58) Field of Classification Search ............... 310/67 R, 310/90, 91; 360/97.08, 99.04–99.08, 99.12; 384/100, 107, 113–115, 192–193, 226–228, 384/243–246, 286, 903, 119
See application file for complete search history.

(56) References Cited

U.S. PATENT DOCUMENTS

| 5,274,289 | A | * | 12/1993 | Wrobel ....................... 310/90 |
|---|---|---|---|---|
| 6,720,694 | B2 | * | 4/2004 | Horng et al. ................... 310/90 |
| 6,828,705 | B1 | | 12/2004 | Choi et al. |
| 7,230,357 | B2 | | 6/2007 | Rojo |
| 7,342,336 | B1 | * | 3/2008 | Horng et al. ................... 310/90 |
| 7,510,331 | B2 | * | 3/2009 | Hong et al. ................... 384/243 |
| 7,525,227 | B2 | * | 4/2009 | Tsuchiya et al. ............... 310/90 |
| 7,649,291 | B2 | * | 1/2010 | Horng et al. ................... 310/90 |
| 2002/0145183 | A1 | * | 10/2002 | Horng et al. ................. 257/678 |

* cited by examiner

*Primary Examiner*—Tran N Nguyen
(74) *Attorney, Agent, or Firm*—Alan Kamrath; Kamrath & Associates PA (57) ABSTRACT

A motor includes a bearing having first and second end faces spaced along a longitudinal axis thereof. A longitudinal hole extends from the first end face through the second end face and includes a recessed portion having first and second peripheral edges respectively contiguous to the first end face and an inner periphery of the longitudinal hole. A retaining member is mounted to the first end face. A radial spacing between an inner periphery of a through-hole of the retaining member and the inner periphery of the longitudinal hole of the bearing in a radial direction is not greater than an axial spacing from the first end face to the second peripheral edge. The retaining member further includes a plurality retaining plates. The recessed portion provides a space sufficient to allow deformation of the retaining plates when inserting a shaft through the through-hole into the longitudinal hole of the bearing.

7 Claims, 7 Drawing Sheets

MOTOR

BACKGROUND OF THE INVENTION

1. Field of the Invention

The present invention relates to a motor and, more particularly, to a motor allowing easy assembly.

2. Description of the Related Art

Figure 1:
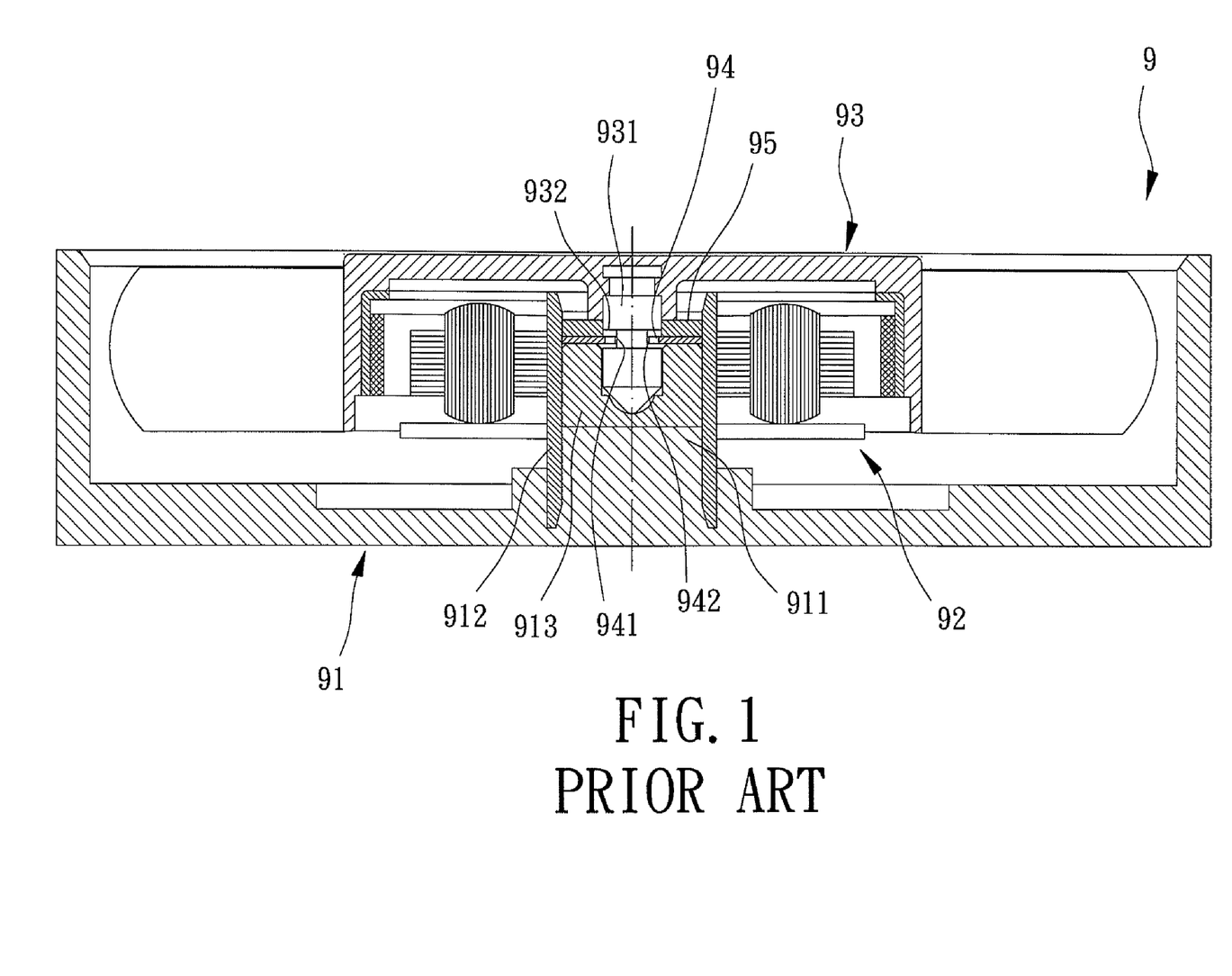
FIG. 1 shows a cross sectional view of a conventional motor.
Figure 2:
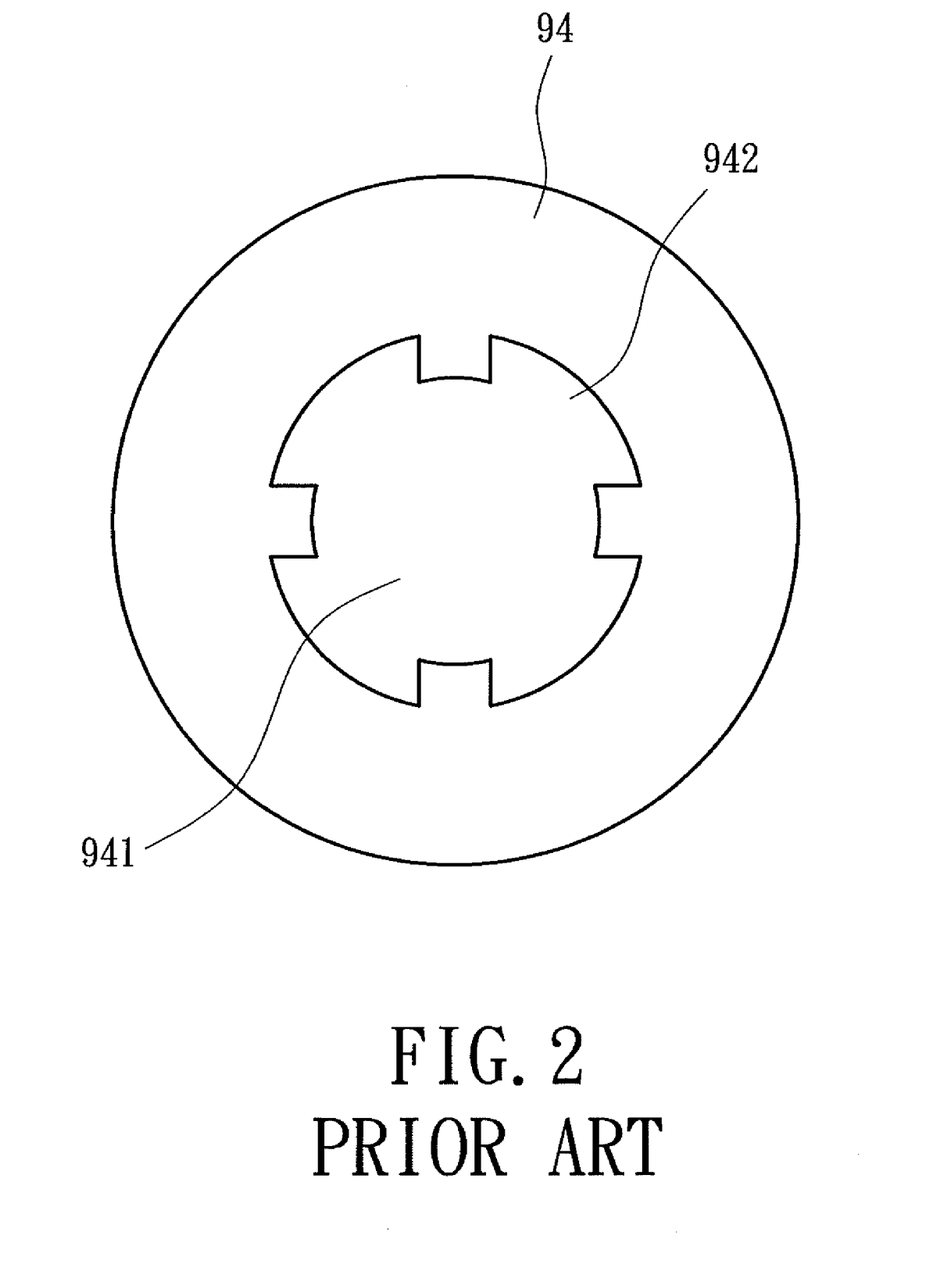
FIG. 2 shows a plan view of a retainer ring of the conventional motor of FIG. 1.

FIG. 1 shows a conventional motor 9 including a housing 91, a stator 92, a rotor 93, a retainer ring 94, and a positioning ring 95. The housing 91 includes a base 911 on which a shaft tube 912 is formed. A bearing 913 is mounted in the shaft tube 912 around which the stator 92 is mounted. The rotor 93 includes a shaft 931 rotatably extending through the bearing 913. The shaft 931 includes an annular groove 932 in an outer periphery thereof. The retainer ring 94 includes a central hole 941 and a plurality of cutouts 942 extending outward from an inner periphery defining the central hole 941, as shown in FIG. 2. The positioning ring 95 is mounted on top of the retainer ring 94. Such a motor is disclosed in Taiwan Patent Application No. 94147553 (Taiwan Patent No. 1283100) entitled "MOTOR FOR FAN."

In assembly, the stator 92, the retainer ring 94, and the positioning ring 95 are firstly assembled in sequence. The shaft 931 is then inserted through the positioning ring 95 and the retainer ring 94 into the bearing 913. By providing the cutouts 942 in the retainer ring 94, the shaft 931 can be forcibly inserted through the central hole 941 of the retainer ring 94, with the retainer ring 94 being engaged in the annular groove 932. The retainer ring 94 prevents the rotor 93 from disengaging from the housing 91 during operation.

The retainer ring 94 abuts against an end face of the bearing 913 that only includes a guiding section for guiding the shaft 931 during assembly. The guiding section can not provide a space sufficient to allow deformation of the retainer ring 94. As a result, it is difficult to forcibly pass the shaft 931 through the central hole 941 of the retainer ring 94, leading to assembly inconvenience. Furthermore, a peripheral edge defining the central hole 941 of the retainer ring 94 is liable to break during forcible insertion of the shaft 931, adversely affecting the retaining function of the retainer ring 94 such that the retainer ring 94 can not effectively prevent the rotor 93 from disengaging from the housing 91.

SUMMARY OF THE INVENTION

The primary objective of the present invention is to provide a motor that solves the problem of insufficient deformation space provided by the bearing of the conventional motor.

A motor according to the preferred teachings of the present invention includes a base, bearing, a retaining member, a rotor, and a stator. The base includes a shaft tube in which the bearing is mounted. The bearing includes first and second end faces spaced along a longitudinal axis of the bearing. The bearing further includes a longitudinal hole extending from the first end face through the second end face along the longitudinal axis of the bearing. The longitudinal hole includes a recessed portion contiguous to the first end face. The recessed portion includes a first peripheral edge contiguous to the first end face and a second peripheral edge contiguous to an inner periphery of the longitudinal hole. The first end face has an axial spacing to the second peripheral edge along the longitudinal axis. The retaining member is mounted to the first end face of the bearing. The retaining member includes a through-hole having an inner periphery. The inner periphery of the through-hole of the retaining member has a radial spacing to the inner periphery of the longitudinal hole of the bearing in a radial direction perpendicular to the longitudinal axis. The radial spacing is not greater than the axial spacing. The retaining member further includes a plurality of annularly spaced grooves each extending from the inner periphery of the through-hole in the radial direction away from the longitudinal axis. A retaining plate is formed between two of the grooves adjacent to each other. The rotor includes a shaft rotatably extending through the longitudinal hole of the bearing. The shaft includes an annular groove in an outer periphery thereof. The retaining plates of the retaining member extend into the annular groove. The stator is mounted around the shaft tube.

When inserting the shaft through the through-hole of the retaining member into the longitudinal hole of the bearing, the recessed portion provides a space sufficient to allow deformation of the retaining plates. Thus, assembling convenience is enhanced, and damage to the retaining member during assembly is avoided.

In a most preferred form, the first peripheral edge has a spacing to the second peripheral edge. Each retaining plate has a length in the radial direction. The length of each retaining plate is not greater than the spacing between the first and second peripheral edges. Thus, the recessed portion provides a larger space allowing deformation of the retaining member during assembly, further enhancing assembling convenience.

In a most preferred form, each groove of the retaining member includes a bottom periphery between the first and second peripheral edges in the radial direction or aligned with the first peripheral edge of the bearing to allow larger deformation of the retaining member during assembly, allowing easy insertion of the shaft through the through-hole of the retaining member.

In a most preferred form, with the recessed portion including an arcuate or rectilinear section interconnected between the first and second peripheral edges, so that the recessed portion provides a space sufficient to allow deformation of the retaining plates.

In a most preferred form, a positioning ring is received in the shaft tube and presses against the retaining member, with the retaining member sandwiched and retained between the positioning ring and the bearing. Thus, the retaining member is prevented from disengaging from the shaft tube of the base, enhancing coupling stability.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "section", "longitudinal", "axial", "radial", "annular", "outward", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A motor of a first embodiment according to the preferred teachings of the present invention is shown in FIGS. 3-6 of the drawings and generally designated 1. According to the preferred form shown, the motor 1 includes a base 10, a bearing 20, a retaining member 30, a rotor 40, and a stator 50.

Figure 3:
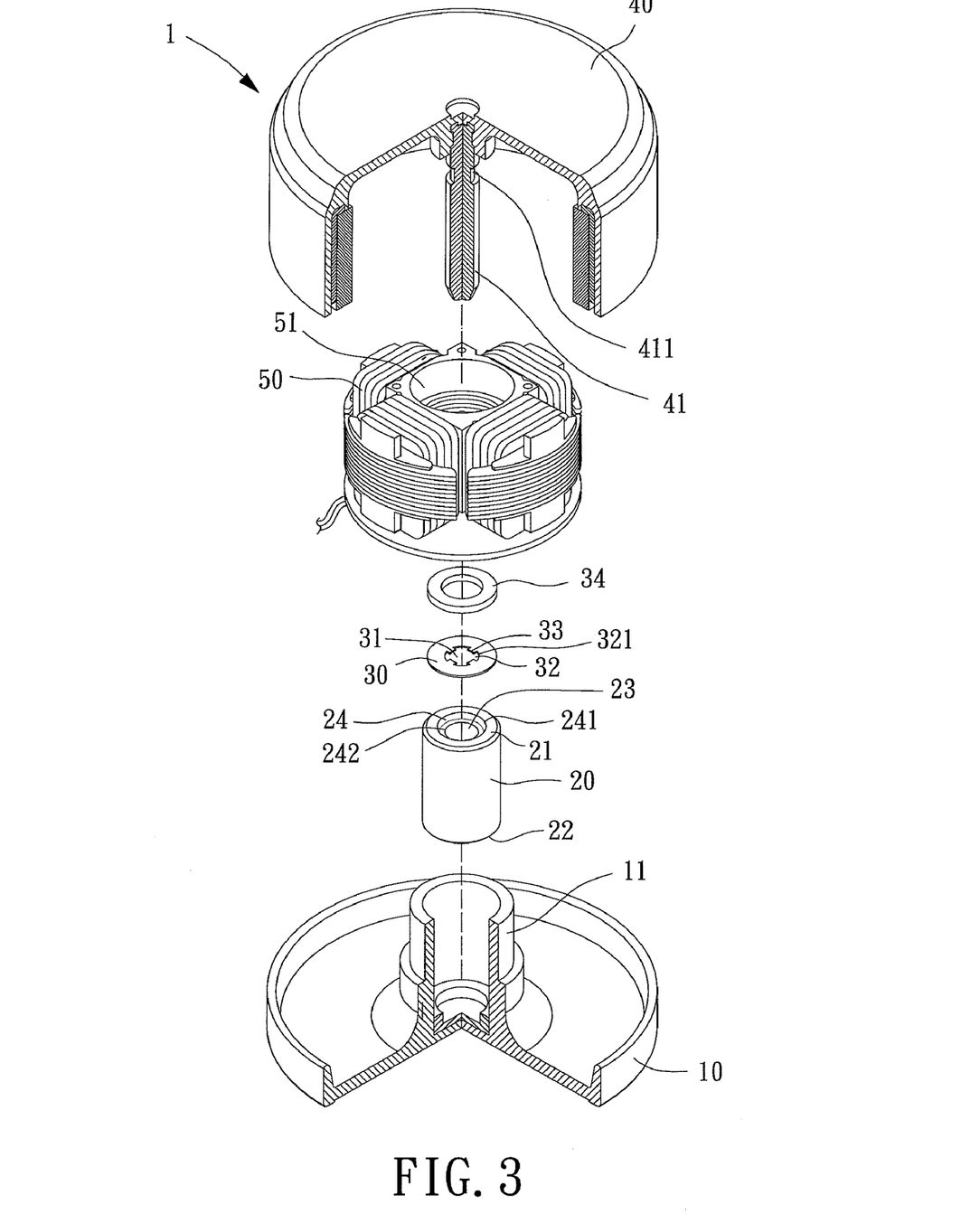
FIG. 3 shows an exploded, perspective view of a motor of a first embodiment according to the preferred teachings of the present invention.
Figure 4:
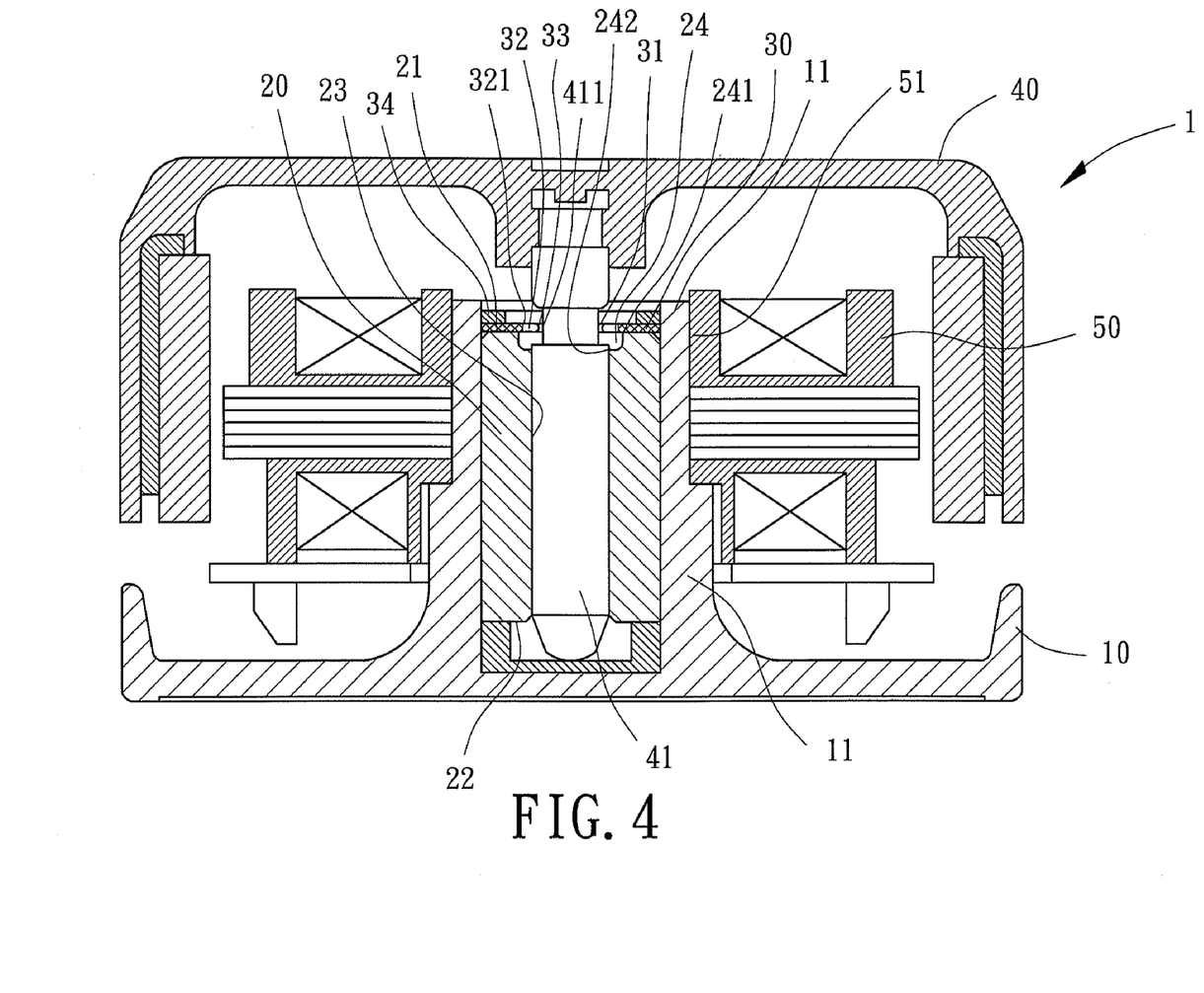
FIG. 4 shows a cross sectional view of the motor of FIG. 3.

The base 10 includes a shaft tube 11. An end of the shaft tube 11 is closed, and the other end of the shaft tube 11 is open for mounting the bearing 20 and the retaining member 30.

Figure 5:
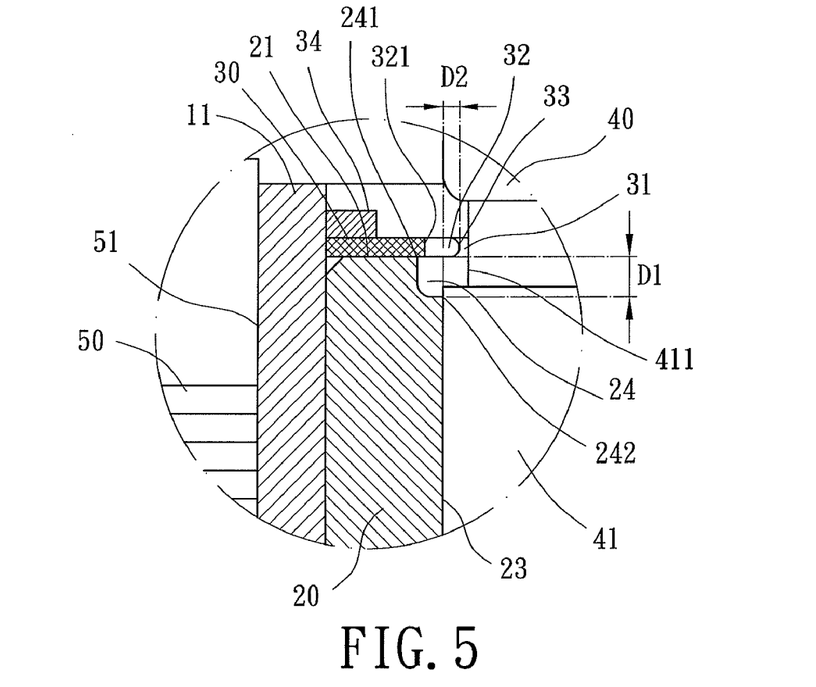
FIG. 5 shows a partial, enlarged, cross sectional view of a portion of the motor of FIG. 3.

The bearing 20 is mounted in the shaft tube 11 and includes first and second end faces 21 and 22 spaced along a longitudinal axis of the bearing 20. The bearing 20 further includes a longitudinal hole 23 extending from the first end face 21 through the second end face 22 along the longitudinal axis. The longitudinal hole 23 includes a recessed portion 24 contiguous to the first end face 21. The recessed portion 24 includes a first peripheral edge 241 contiguous to the first end face 21 and a second peripheral edge 242 contiguous to an inner periphery of the longitudinal hole 23, with the first end face 21 having an axial spacing D1 to the second peripheral edge 242 along the longitudinal axis (FIG. 5). Preferably, a section of the recessed portion 24 interconnected between the first and second peripheral edges 241 and 242 is an arcuate or rectilinear face in cross section or has other shapes.

The retaining member 30 is mounted to the first end face 21 of the bearing 20 and received in the shaft tube 11. The retaining member 30 includes a through-hole 31. An inner periphery of the through-hole 31 of the retaining member 30 has a radial spacing D2 to the inner periphery of the longitudinal hole 23 of the bearing 20 in a radial direction perpendicular to the longitudinal axis. The radial spacing D2 is not greater than the axial spacing D1. The retaining member 30 further includes a plurality of annularly spaced grooves 32 each extending from the inner periphery of the through-hole 31 in the radial direction away from the longitudinal axis. A retaining plate 33 is formed between two grooves 32 adjacent to each other. Each groove 32 further includes a bottom periphery 321 between the first and second peripheral edges 241 and 242 in the radial direction.

The rotor 40 includes a shaft 41 rotatably extending through the longitudinal hole 23 of the bearing 20. The shaft 41 includes an annular groove 411 in an outer periphery thereof. The retaining plates 33 of the retaining member 30 extend into the annular groove 411, preventing the rotor 40 from disengaging from the base 10. The stator 50 includes an assembling hole 51 allowing it to be mounted around an outer periphery of the shaft tube 11.

In assembly, the stator 50 is mounted around the outer periphery of the shaft tube 11. The bearing 20 and the retaining member 30 are mounted into the shaft tube 11 of the base 10, so that the retaining member 30 is preferably fixed in the shaft tube 11 and coupled to the first end face 21 of the bearing 20 by close-fit. According to the most preferred form shown, a positioning ring 34 is mounted in the shaft tube 11 and presses against the retaining member 30, so that the retaining member 30 is sandwiched and retained between the positioning ring 34 and the bearing 20 (FIGS. 4 and 5).

Figure 6:
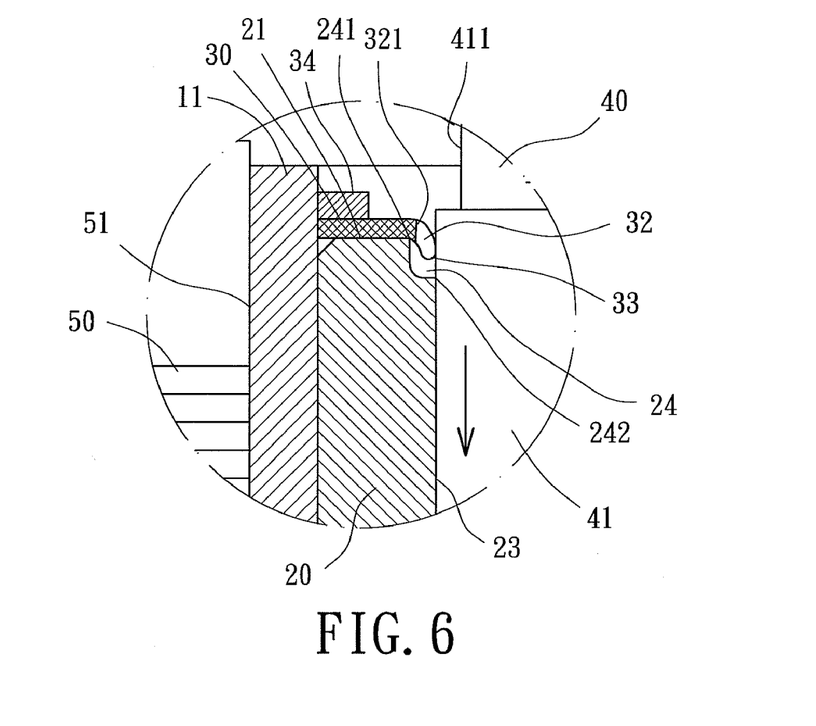
FIG. 6 shows a partial, enlarged, cross sectional view of the portion of the motor of FIG. 3, illustrating deformation of a retaining member during assembly of a rotor of the motor.

When the shaft 41 of the rotor 40 is forcibly inserted through the through-hole 31 of the retaining member 30, the retaining plates 33 of the retaining member 30 deform. Since the retaining member 30 includes a plurality of grooves 32 and since the radial spacing D2 is smaller than the axial spacing D1, the recessed portion 24 provides a sufficient space for receiving the deformed retaining plates 33. In other words, the recessed portion 24 provides a space sufficient to allow deformation of the retaining plates 33 while inserting the shaft 41 through the through-hole 31 of the retaining member 30 into the longitudinal hole 23 of the bearing 20. When the shaft 41 reaches its position, the retaining plates 33 return to their original positions by resiliency, so that the retaining plates 33 extend into the annular groove 411 of the shaft 41, preventing the rotor 40 from disengaging from the base 10.

Figure 7:
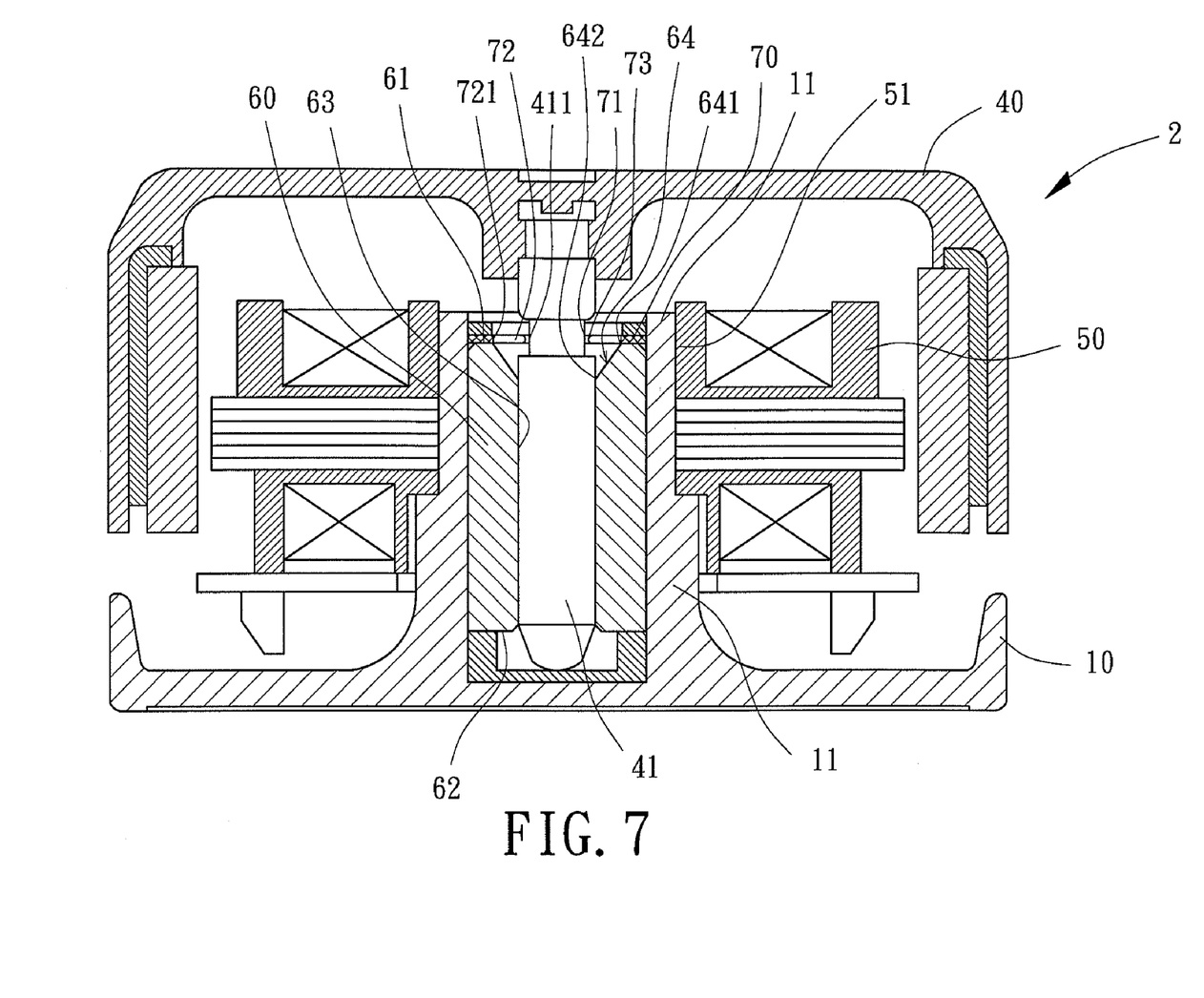
FIG. 7 shows a cross sectional view of a motor of a second embodiment according to the preferred teachings of the present invention.
Figure 8:
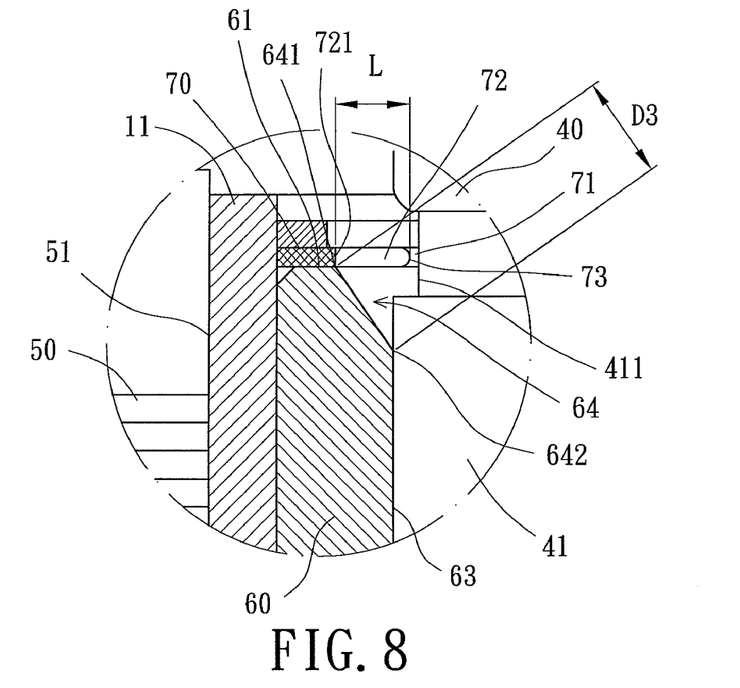
FIG. 8 shows a partial, enlarged, cross sectional view of a portion of the motor of FIG. 7.
Figure 9:
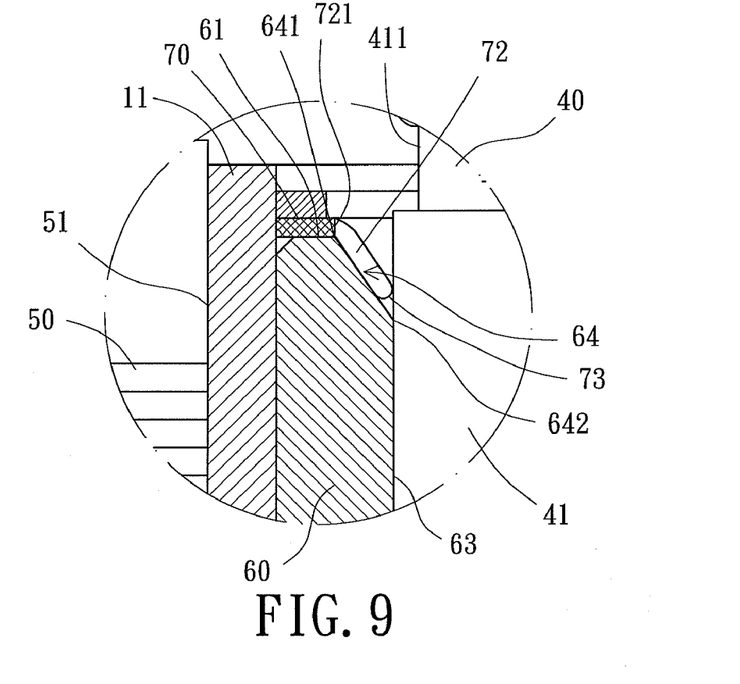
FIG. 9 shows a partial, enlarged, cross sectional view of the portion of the motor of FIG. 7, illustrating deformation of a retaining member during assembly of a rotor of the motor.

A motor of a second embodiment according to the preferred teachings of the present invention is shown in FIGS. 7-9 and generally designated 2. According to the preferred form shown, the motor 2 includes a base 10, a bearing 60, a retaining member 70, a rotor 40, and a stator 50. The base 10, the rotor 40, and the stator 50 are identical to those of the first embodiment and, therefore, not described in detail to avoid redundancy. Particularly, the bearing 60 includes first and second end faces 61 and 62 spaced along the longitudinal axis of the bearing 60. The bearing 60 further includes a longitudinal hole 63 extending from the first end face 61 through the second end face 62 along the longitudinal axis. The longitudinal hole 63 includes a recessed portion 64 contiguous to the first end face 61. The recessed portion 64 includes a first peripheral edge 641 contiguous to the first end face 61 and a second peripheral edge 642 contiguous to an inner periphery of the longitudinal hole 63, with the first peripheral edge 641 having a spacing D3 to the second peripheral edge 642 (FIG. 8). Preferably, a section of the recessed portion 64 interconnected between the first and second peripheral edges 641 and 642 is an arcuate or rectilinear face in cross section or has other shapes. According to the most preferred form shown, the section is rectilinear and has an acute angle with the longitudinal axis of the bearing 60.

The retaining member 70 is mounted to the first end face 61 of the bearing 60. The retaining member 70 includes a through-hole 71. The retaining member 70 further includes a plurality of annularly spaced grooves 72 each extending from the inner periphery of the through-hole 71 in the radial direction away from the longitudinal axis. A retaining plate 73 is formed between two grooves 72 adjacent to each other. Each groove 72 further includes a bottom periphery 721 aligned with the first peripheral edge 641 of the bearing 60. Furthermore, each retaining plate 73 has a length L in the radial direction not greater than the spacing D3 between the first and second peripheral edges 641 and 642 (FIG. 8).

Since the bottom periphery 721 of each groove 72 of the retaining member 70 is aligned with the first peripheral edge 641 of the bearing 60, a larger space is required for receiving the deformed retaining plates 73 while inserting the shaft 41 of the rotor 40 through the through-hole 71 of the retaining member 70. With reference to FIGS. 8 and 9, since the length L is not greater than the spacing D3, the recessed portion 64 provides a space sufficient to allow deformation of the retaining plates 73 while inserting the shaft 41 through the through-hole 71 of the retaining member 70 into the longitudinal hole 63 of the bearing 60. When the shaft 41 reaches its position, the retaining plates 73 return to their original positions by resiliency, so that the retaining plates 73 extend into the annular groove 411 of the shaft 41, preventing the rotor 40 from disengaging from the base 10.

As mentioned above, when inserting the shaft 41 through the through-hole 31, 71 of the retaining member 30, 70 into the longitudinal hole 23, 63 of the bearing 20, 60, the recessed portion 24, 64 provides a space sufficient to allow deformation of the retaining member 30, 70. Thus, the shaft 41 can be inserted through the through-hole 31, 71 of the retaining member 30, 70 more easily, enhancing assembling convenience. Furthermore, due to provision of the recessed portion 24, 64 providing the space sufficient to allow deformation of the retaining member 30, 70, the peripheral edge of the through-hole 31, 71 is less likely to breakage during insertion of the shaft 41, preventing disengagement of the rotor 40 from the base 10 during operation and assuring quality of the motor 1, 2 according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor comprising, in combination:
    a base including a shaft tube;
    a bearing mounted in the shaft tube and including first and second end faces spaced along a longitudinal axis of the bearing, with the bearing further including a longitudinal hole extending from the first end face through the second end face along the longitudinal axis of the bearing, with the longitudinal hole including a recessed portion contiguous to the first end face, with the recessed portion including a first peripheral edge contiguous to the first end face and a second peripheral edge contiguous to an inner periphery of the longitudinal hole, with the first end face having an axial spacing to the second peripheral edge along the longitudinal axis;
    a retaining member mounted to the first end face of the bearing, with the retaining member including a through-hole having an inner periphery, with the inner periphery of the through-hole of the retaining member having a radial spacing to the inner periphery of the longitudinal hole of the bearing in a radial direction perpendicular to the longitudinal axis, with the radial spacing being not greater than the axial spacing, with the retaining member further including a plurality of annularly spaced grooves each extending from the inner periphery of the through-hole in the radial direction away from the longitudinal axis, with a retaining plate formed between two of the plurality of grooves adjacent to each other;
    a rotor including a shaft rotatably extending through the longitudinal hole of the bearing, with the shaft including an annular groove in an outer periphery thereof, with the retaining plates of the retaining member extending into the annular groove; and
    a stator mounted around the shaft tube.

2. The motor as claimed in claim 1, with the first peripheral edge having a spacing to the second peripheral edge, with each of the retaining plates having a length in the radial direction, and with the length of each of the retaining plates being not greater than the spacing between the first and second peripheral edges.

3. The motor as claimed in claim 2, with each of the plurality of grooves of the retaining member including a bottom periphery between the first and second peripheral edges in the radial direction.

4. The motor as claimed in claim 2, with each of the plurality of grooves of the retaining member including a bottom periphery aligned with the first peripheral edge of the bearing.

5. The motor as claimed in claim 1, with the recessed portion including a section interconnected between the first and second peripheral edges, with the section being rectilinear in cross section, and with the section having an acute angle with the longitudinal axis of the bearing.

6. The motor as claimed in claim 1, with the recessed portion including an arcuate section interconnected between the first and second peripheral edges.

7. The motor as claimed in claim 1, further comprising, in combination: a positioning ring received in the shaft tube and pressing against the retaining member, with the retaining member sandwiched and retained between the positioning ring and the bearing.

* * * * *